United States Patent [19]

Mitoff et al.

[11] 3,896,019

[45] July 22, 1975

[54] METHOD OF FORMING BETA-ALUMINA ARTICLES

[75] Inventors: Stephan P. Mitoff, Elnora; Robert W. Powers, Schenectady; Randall N. King, Johnstown, all of N.Y.

[73] Assignee: General Electric Company, Schenectady, N.Y.

[22] Filed: Oct. 4, 1973

[21] Appl. No.: 403,454

[52] U.S. Cl. .................. 204/181; 264/63; 136/153
[51] Int. Cl.² ... C04B 35/10; C04B 35/64; C25D 1/14
[58] Field of Search ....... 204/181; 136/153; 264/63, 264/66

[56] References Cited
UNITED STATES PATENTS

| | | | |
|---|---|---|---|
| 3,027,313 | 3/1962 | Halstead et al. | 204/181 |
| 3,223,607 | 12/1965 | Millner et al. | 204/181 |
| 3,607,436 | 9/1971 | Charles et al. | 136/153 |

OTHER PUBLICATIONS

Fally et al., Journal of the Electrochemical Society, Vol. 120, No. 10, (Oct. 1973), pp. 1296–1298.

*Primary Examiner*—Howard S. Williams
*Attorney, Agent, or Firm*—Paul R. Webb, II; Joseph T. Cohen; Jerome C. Squillaro

[57] ABSTRACT

A method of forming beta-alumina articles includes sintering beta-alumina greenware between 1650° and 1825°C in a preheated oxygen oxidizing atmosphere at a controlled passage rate from one-half to four inches per minute. Such articles are useful as containers for sodium and as solid electrolytes in sodium-sulfur and sodium-halogen batteries.

6 Claims, No Drawings

METHOD OF FORMING BETA-ALUMINA ARTICLES

The present invention relates generally to a method of forming ionically conductive ceramics and is more particularly concerned with an improved method of forming smooth, uniform beta-alumina articles having good electrical and structural characteristics.

Beta-alumina articles are useful as solid electrolytes in electrical energy storage devices in a variety of combinations of electrode materials useful over a broad range of operating temperature conditions. For example, a high-energy battery employs an anode of sodium and a cathode of sulfur in which both the sodium and sulfur are in the molten state at operating temperature and are in contact with and separated by an electrolyte of a thin, plate-like article or of a closed-end tube of sodium beta-alumina. A high-energy battery can also employ in a similar structure an anode of the sodium type and a halogen cathode separated by the same type of sodium beta-alumina electrolyte. Kummer et al U.S. Pat. No. 3,404,036 describes the use of a plate-like article of sodium beta-alumina as the solid electrolyte in an energy conversion device. A closed-end tube or casing of sodium beta-alumina as the solid electrolyte in a sodium-halogen battery is described in copending patent application Ser. No. 228,082, filed Feb. 22, 1972, now U.S. Pat. No. 3,752,955, for "Sealed Primary Sodium-Halogen Battery." This application is assigned to the same assignee as the present application.

In French Pat. Addition No. 95,549, which was published on Jan. 22, 1971, there is a discussion of the principal U.S. Pat. No. 1,597,279 of Dec. 27, 1968. Both French principal Pat. No. 1,597,279 of Dec. 27, 1968 and French Pat. Addition No. 95,549 published on Jan. 22, 1971 deal with an improved procedure for making thin specimens of sinterable material, in particular ceramic material such as zirconia. Such specimens can be used as solid electrolytes in fuel cells operating at high temperature.

In the principal patent, such specimens are produced by preparing a homogeneous slurry in a solvent containing a binder. This slurry is then applied to a mandrel, covering it with a layer of uniform thickness which should be thicker than the desired final thickness. The covered mandrel is then isostatically pressed. After removing the mandrel, the specimen is sintered according to the principal French patent.

In the principal patent, a slurry has to contain such an amount of sinterable material and has to be of such viscosity, that one gets a layer of uniform thickness on the mandrel by simply dipping it into the slurry for a sufficient period of time. The slurry is made by suspending zirconia, stabilized by addition of yttrium oxide, in demineralized water containing some polyvinyl alcohol. The particle size of the zirconia should be smaller than 1 micron. This suspension is made in a ball mill. It has to be degassed before the dipping process can take place. After dipping, the mandrel covered by the paste-like layer is isostatically pressed. The mandrel is then removed and the pieces are sintered.

The sintering can consist of a first treatment in oxygen atmosphere at temperatures near 1500°C. This treatment is followed by a second one at 2000°C or 2100°C in vacuum or in an inert gas atmosphere. Finally, a third one is made again at 1500°C in air atmosphere in order to reoxidize the product. As a result, one gets specimens which have a very homogeneous structure and are prefectly leak tight.

The patent of addition also relates to a procedure for fabricating specimens of sinterable material, in particular ceramic material. The material is first deposited onto a suitable mandrel. This is followed by an isostatic pressing process. Only then can one sinter the samples as described in the principal patent.

We understand that sodium beta-alumina can be formed in accordance with the above French patent addition. Further, in copending patent applications Ser. No. 400,047, filed Sept. 24, 1973, and Ser. No. 400,046, filed Sept. 24, 1973, and both entitled "Method of Forming Beta-Alumina Articles," there are described and claimed methods which are improvements over the above French patent addition. These applications are assigned to the same assignee as the present application. Our present application includes an improved sintering method over the above French patent addition.

The present application is directed to an improved method of forming beta-alumina articles which are useful as solid electrolytes in various types of sodium batteries. Our present application provides the unique step of sintering beta-alumina greenware at a temperature between 1650 and 1825°C by passage through a preheated oxygen oxidizing atmosphere at a controlled rate from one-half to four inches per minute thereby resulting in a dense, sintered beta-alumina article.

Our preferred oxygen oxidizing atmosphere is provided by a resistance type furnace, such as described by L. Navias in American Ceramic Society Bulletin, Vol. 36, (7), pages 262–267, 1957.

An article No. 11 entitled "Production of $\beta$-Al$_2$O$_3$ Electrolyte" appears by I. Wynn Jones and L. J. Miles in Proceedings of the British Ceramic Society, No. 19, 1970. Beta-alumina electrolyte has been prepared, according to the article, in the form of long thin tubes of isostatic pressure moulding of a mixture of alpha-alumina and sodium aluminate followed by sintering between 1600° and 1900°C in an inductively heated furnace thereby converting the material to beta-alumina. A five minute firing time is used by moving the pressed tube through a 2.5 inch hot zone at 0.5 inch per minute.

The primary object of our invention is to provide an improved method which results in the simplified and reproducible production of smooth, uniform beta-alumina articles.

In accordance with one aspect of our invention, a method of forming beta-alumina articles includes sintering the greenware at a temperature between 1650° and 1825°C in a preheated oxygen oxidizing atmosphere at a controlled passage rate through the furnace at from one-half to four inches a minute.

These and various other objects, features and advantages of the invention will be better understood from the following description.

Our method is applicable to various beta-alumina greenware configurations which greenware has been formed by a variety of methods, such as pressing, isostatic pressing and electrophoretic deposition. However, it is necessary that the greenware have a density of more than 40 percent of theoretical density. Secondly, it is necessary that the beta-alumina particles be less than 5 microns. Our preferred size is less than 2 microns.

Our preferred method of preparing beta-alumina greenware is in accordance with either of the above copending patent applications Ser. No. 400,047 or Ser. No. 400,046. The following description is provided of the methods in these copending patent applications.

In providing a simplified but improved process in copending application Ser. No. 400,047 a selection was commenced for a suitable vehicle for the dispersion of the beta-alumina particles which was most important since this selection determined whether a deposit was obtained or not and to some extent the viscous qualities of the deposit. It was found that electrophoretic deposits were obtained only from vehicles with dielectric constants in the range from about 12 to 24. Following initial experiments in Ser. No. 400,047 with a large number of vehicles and mixtures of vehicles, nearly all subsequent work was carried out with a preferred vehicle n-amyl alcohol (1-pentanol). Its dielectric constant is 13.9. With it, neither the formation of anodic films on the mandrels nor that of fluid deposits was observed.

The following is a preferred milling process which is described in the above copending applications. A friable powder is used such as Alcoa XB-2 beta-alumina, a commercial product of Alcoa Company, New York, N.Y. Milling is carried out at a high powder concentration, e.g., 200 grams per 200 ml n-amyl alcohol vehicle. The suspension is milled in a clean polyethylene jar. Zirconia is used in preference to alpha-alumina media. If slight contamination by zirconia is intolerable, a 91% alumina media is employed.

An electrophoretic deposition apparatus for carrying out our present invention comprises a stainless steel vessel which functions as a counter electrode filled with a suspension. In copending application Ser. No. 400,047 the suspension includes milled beta-alumina particles and the n-amyl alcohol vehicle. In copending application Ser. No. 400,047 a small amount of aluminum tristearate was added at concentrations of approximately 0.1 to 1.0 percent by weight of the beta-alumina. In our present invention, either of the above suspensions can be employed. This suspension is transferred from the polyethylene jar after the grinding or milling has been accomplished.

A stainless steel mandrel has a deposition portion, tape surrounding a non-deposition portion, a portion fitted within an electrically insulating cover for the vessel, and a portion extending outwardly from the cover. A high voltage source is connected by a negative (−) lead to a clamp attached to the vessel thereby making the vessel the negative counter electrode. The deposition portion of the mandrel is made the positive electrode (+) by connection of a positive lead from the high voltage source to the portion extending from the cover of the mandrel. A current meter, a current recorder and a charge indicator are connected in series with the power source. The high voltage source is a standard commercial device which has been used to apply voltages in the range 200 to 1000V between the mandrel and the counter electrode. Such voltages correspond to fields between 100 and 10,000 V/cm. It is preferred practice to use the highest fields permitted by the power supply. This procedure usually reduces deposition times to about a minute and makes stirring of the suspension unnecessary during deposition.

Deposition in electrophoretic forming is carried out as is conventional in the art by applying a DC voltage from the power source between the deposition portion of the mandrel and the counter electrode. The tape portion can be of a different length or eliminated depending on the length of the beta-alumina closed-end tube desired. Open-end tubes are produced by applying the same tape on the lower end of a slightly tapered mandrel. Other beta-alumina articles have been produced in disc and pocket-shaped configurations by using a correspondingly shaped mandrel under similar conditions.

Satisfactory removal of deposits depends on the nearly complete elimination of vehicle from the deposit. Release of green deposits in the form of closed-end tubes can usually be accomplished after drying overnight in an oxygen oxidizing atmosphere, such as air, at room temperature. At most 24 hours are needed. However, up to three days of drying may be required for the 3mm thick deposits formed on larger mandrels such as the one for forming pocket-shaped pieces. The drying of green deposits can be accelerated by treatment in a vacuum oven. However, greater care must then be exercised in the choice of mandrel material.

The properties of sintered beta-alumina depend on details associated with each of the three major fabrication steps: the preparation of starting powders, the forming of greenware, and finally the sintering procedure. Sintering of green beta-alumina ware has been carried out in above copending patent applications in an oxygen oxidizing atmosphere, such as oxygen or air at temperatures between 1700° and 1825°C for times ranging from a few minutes to several hours.

We found unexpectedly that we could secure high density, low resistivity beta-alumina articles by a special type of controlled sintering. We found that such desirable articles were produced by controlling both temperature and the time of exposure of the greenware to the temperature.

The usual practice for sintering greenware is to place the greenware in a furnace, increase the furnace temperature to the desired sintering value, hold the sintering temperature at the desired value for a period of time, cool the ware, and withdraw the sintered ware from the furnace. Our controlled sintering is uniquely different from this conventional practice. With our method, beta-alumina greenware is passed at a temperature between 1650° and 1825°C through a preheated oxygen oxidizing atmosphere and at a controlled passage rate of from one-half to four inches per minute resulting in dense, sintered beta-alumina articles which are satisfactory for employment as solid ion-conducting electrolytes in cells or batteries. We have found that the temperature and sintering rate are independent of wall thickness up to thicknesses of 1 centimeter. The resulting article has high density and low resistivity. We found that with the above preheated oxygen oxidizing atmosphere, the temperature range had several preferred ranges therein depending on suspension composition. With the addition of 1.0% magnesia and 0.5 percent yttria in the beta-alumina greenware, the preferred temperature range was 1725° to 1800°C. Within this preferred range, the specific preferred temperature and passage or traverse rate was 1800°C and one inch per minute. With the addition of only 1.0% magnesia in the beta-alumina greenware, the preferred temperature range was lower, and was between 1700° to 1750°C. Within this second preferred range, the specific preferred temperature and traverse rate was 1750°C and two inches per minute. When beta-alumina greenware without additives is employed, the preferred temperature range is lower than when the above additives are employed, and is between 1650° to 1750°C. We have not as yet determined the specific preferred temperature within this third preferred range.

While the formation of closed-end tubes will be described, it will be appreciated that beta-alumina articles in other configurations can be formed by our method. For example, disks, open-ended tubes and pocket-shaped pieces can be formed in this manner.

In the preferred practice of our invention, sintered closed-end tubes are formed in the following manner. Greenware was formed by electrophoretically forming the tubes. Greenware of approximately 1 cm outer diameter and 10 cm in length was placed on saggers constructed preferably from porous, pure alumina furnace tubes split lengthwise into halves. A sagger or train of saggers was arranged on a semicylindrical tray which served as an extension of an open-ended high density alumina tube, the center portion of which is within a furnace. The sagger or saggers were then pushed through this sintering tube at rates ranging from ½ to 4 inches per minute. Thus greenware entered the tube furnace at its front end and sintered ware was removed from the rear end. Since the sintering tube was at its maximum temperature for a length of only about 3 inches, ware was thus exposed to this temperature for times ranging from about 6 to ¾ minutes. Saggers were pushed through the furnace using a variable speed motor driven pushrod.

The furnace used was of the resistance type with a muffle of 1.75 in. internal diameter. Furnaces of this type were referenced above in the article by L. Navias in American Ceramic Society Bulletin. Our furnace had a molybdenum winding covering approximately a 12 in. length of muffle. This winding was protected from oxidation by a flow of hydrogen through the interior of the furnace at a rate of about 20 cubic feet per hour. The ware undergoing sintering however was exposed to an air atmosphere inside the dense alumina sintering tube. The furnace temperature was controlled with a Leeds and Northrup PAT controller. This temperature was sensed with a tungsten rhenium thermocouple placed along the outside of the sintering tube. We used sintering temperatures ranging from 1650° to 1825°C. These temperatures were determined inside the ware undergoing sintering with an optical pyrometer and were believed to be very close to the blackbody equilibrium values. The resulting articles were made in accordance with our invention.

Examples of beta-alumina articles made in accordance with the method of our invention are as follows:

EXAMPLES 1-29

In Examples 1-29, 29 closed end tubes of beta-alumina were prepared. Three types of suspensions were prepared. From type 1 suspension, tubes 1-14 were formed. From type 2 suspension, tubes 15-29 were formed. Tubes were prepared from suspensions containing 150 grams of Alcoa XB-2 beta-alumina powder in 150 ml of n-amyl alcohol. The beta-alumina powder in type 1 suspension contained additionally 1.0% of magnesia and 0.5% yttria. That in type 2 suspension contained additionally 1.0% magnesia. Each suspension of these materials was milled for 18 hours using 1800 grams zirconia cylinders in a polyethylene milling jar. Subsequently, each suspension was transferred to a separate stainless steel vessel as described above.

A mandrel was employed with an exposed surface portion having a length of 4 inches. An initial DC electric field of 1,980 volts per centimeter was applied from the power source across the mandrel as the positive electrode and across the vessel as the negative electrode. The tubes, which are numbered 1-29, correspond to Examples 1-29.

After the above depositions each closed-end tube was air dried for at least 16 hours on its respective mandrel. Each closed-end tube was then removed from its mandrel and sintered under controlled conditions as described above.

Tables I and II set forth for tubes 1-14 and tubes 15-29, respectively, the traverse rate in inches per minute of each tube through the preheated furnace, the maximum greenware sintering temperature in degrees centigrade, the resulting tube density in grams per centimeter, and the specific resistivity in kiloohm centimeters at 25°C.

TABLE I

| Tube No. | Traverse Rate Through Furnace in./min. | Maximum Greenware Sintering Temperature °C | Density g./cc. | Specific Resistivity K ω cm |
|---|---|---|---|---|
| 1 | 0.5 | 1725 | 3.238 | 2.08 |
| 2 | 0.5 | 1750 | 3.239 | 0.61 |
| 3 | 0.5 | 1775 | 3.205 | 1.49 |
| 4 | 0.5 | 1800 | 3.183 | 3.52 |
| 5 | 0.5 | 1825 | 3.168 | 6.19 |
| 6 | 1.0 | 1750 | 3.225 | 7.00 |
| 7 | 1.0 | 1775 | 3.241 | 2.26 |
| 8 | 1.0 | 1800 | 3.229 | 1.96 |
| 9 | 1.0 | 1825 | 3.208 | 1.41 |
| 10 | 2.0 | 1725 | 3.140 | 6.20 |
| 11 | 2.0 | 1750 | 3.192 | 4.30 |
| 12 | 2.0 | 1775 | 3.229 | 2.47 |
| 13 | 2.0 | 1800 | 3.246 | 3.59 |
| 14 | 2.0 | 1825 | 3.243 | 2.78 |

TABLE II

| Tube No. | Traverse Rate Through Furnace in./min. | Maximum Greenware Sintering Temperature °C | Density g./cc. | Specific Resistivity K ω cm |
|---|---|---|---|---|
| 15 | 0.5 | 1700 | 3.102 | 1.21 |
| 16 | 0.5 | 1725 | 3.200 | 0.406 |
| 17 | 0.5 | 1750 | 3.231 | 0.192 |
| 18 | 0.5 | 1775 | 3.205 | 0.103 |
| 19 | 0.5 | 1800 | 3.196 | 0.119 |
| 20 | 1.0 | 1700 | 3.058 | 2.46 |
| 21 | 1.0 | 1725 | 3.118 | 0.857 |
| 22 | 1.0 | 1750 | 3.226 | 0.506 |
| 23 | 1.0 | 1775 | 3.234 | 0.209 |
| 24 | 1.0 | 1800 | 3.214 | 0.225 |
| 25 | 2.0 | 1700 | 3.051 | 3.70 |
| 26 | 2.0 | 1725 | 3.166 | 0.655 |
| 27 | 2.0 | 1750 | 3.226 | 0.850 |
| 28 | 2.0 | 1775 | 3.234 | 0.894 |
| 29 | 2.0 | 1800 | 3.250 | 0.533 |

EXAMPLES 30-40

In Examples 30-40, 11 closed-end tubes of beta-alumina were prepared. Two separate suspensions were prepared. From suspension 1, tubes 30-35 were formed. From suspension 2, tubes 36-40 were formed. The suspensions contained 150 grams and 200 grams of Alcoa XB-2 beta-alumina powder in 300 ml and in 200 ml of n-amyl alcohol, respectively. These materials were milled for 18 hours using 1800 grams zirconia cylinders and for 24 hours using 91% alumina balls, respectively, in a polyethylene jar. The second suspension was diluted further with 200 ml of n-amyl alcohol. Subsequently, each suspension was transferred to a separate stainless steel vessel as described above.

A mandrel was employed with an exposed surface portion having a length of 4 inches. A cell voltage of 990 volts was applied from the power source across the mandrel as the positive electrode and across the vessel as the negative electrode. The tubes, which are numbered 30–40, correspond to Examples 30–40.

After the above depositions each closed-end tube was air dried for at least 16 hours on its respective mandrel. Each closed-end tube was then removed from its mandrel and sintered at 1795°C under controlled conditions as described above.

Table III sets forth for tubes 30–35, the traverse rate in inches per minute of each tube through the preheated furnace, the resulting tube density in grams per cubic centimeter, and the specific resistivity in kiloohms centimeter at 25°C. Table III sets forth for tubes 36–40, the traverse rate in inches per minute of each tube through the preheated furnace, and the resulting tube density in grams per cubic centimeter.

TABLE III

| Tube No. | Traverse Rate Through Furnace in./min. | Density g./cc. | Specific Resistivity K $\omega$ cm |
|---|---|---|---|
| 30 | 1.0 | 3.2 | 0.70 |
| 31 | 1.0 | 3.2 | 0.70 |
| 32 | 2.0 | 3.25 | 1.50 |
| 33 | 2.0 | 3.25 | 1.50 |
| 34 | 2.0 | 3.23 | 1.50 |
| 35 | 4.0 | 3.23 | 3.00 |
| 36 | 0.5 | 3.14 | — |
| 37 | 1.0 | 3.18 | — |
| 38 | 1.0 | 3.19 | — |
| 39 | 2.0 | 3.17 | — |
| 40 | 4.0 | 2.90 | — |

While other modifications of the invention and variations thereof which may be employed within the scope of the invention have not been described, the invention is intended to include such as may be embraced within the following claims:

What we claim as new and desire to secure by Letters Patent of the United States is:

1. A method of forming a beta-alumina article which comprises providing a plurality of beta-alumina particles the majority of which have a diameter from submicron size to 5 microns, forming the particles into greenware with a density of at least 40 percent of the theoretical density, and passing the greenware at a temperature between 1650° and 1825°C through a preheated oxygen oxidizing atmosphere and at a controlled passage rate of from one-half to four inches per minute with greenware exposure to such temperature ranging from about 6 minutes to ¾ minute resulting in a dense, sintered beta-alumina article.

2. A dense, sintered beta-alumina article made in accordance with the method of claim 1.

3. A method of forming a beta-alumina article which comprises a suspension of beta-alumina particles the majority of which have a diameter from submicron size to 2 microns in an organic fluid having a dielectric constant at 25°C of from 12 to 24, electrophoretically depositing the beta-alumina particles from the suspensions onto a charged electrode in a DC electric field of from 100 to 10,000 volts per centimeter as greenware with a density of at least 40 percent of the theoretical density, drying the greenware on the electrode, removing the greenware from the electrode, and passing the greenware at a temperature between 1650° and 1825°C through a preheated oxygen oxidizing atmosphere and at a controlled passage rate of from one-half to four inches per minute with greenware exposure to such temperature ranging from about 6 minutes to ¾ minute resulting in a dense, sintered beta-alumina article.

4. In a method of forming a beta-alumina article as in claim 3, in which the suspension consists of beta-alumina and an organic fluid, and the oxidizing atmosphere temperature is between 1650° and 1750°C.

5. A method of forming a beta-alumina article as in claim 3, in which the suspension contains 1.0% magnesia, and the oxidizing atmosphere temperature is between 1700° and 1750°C.

6. In a method of forming a beta-alumina article as in claim 3, in which the suspension contains 1.0% magnesia and 0.5% yttria, and the oxidizing atmosphere temperature is between 1725° and 1800°C.

* * * * *